United States Patent [19]

Van Heel

[11] 4,219,010
[45] Aug. 26, 1980

[54] METHOD AND APPARATUS FOR UTILIZING SOLAR HEAT

[75] Inventor: Joannes M. Van Heel, Rotterdam, Netherlands

[73] Assignee: Stichting Bouwcentrum, Rotterdam, Netherlands

[21] Appl. No.: 769,947

[22] Filed: Feb. 18, 1977

[30] Foreign Application Priority Data

Feb. 19, 1976 [NL] Netherlands .......................... 7601677
Apr. 12, 1976 [NL] Netherlands .......................... 7603857
Aug. 11, 1976 [NL] Netherlands .......................... 7608916

[51] Int. Cl.² .............................................. F24J 3/02
[52] U.S. Cl. ...................................... 126/430; 126/448
[58] Field of Search ............... 126/270, 271, 400, 430, 126/436, 450, 448; 237/1 A; 165/172, 173, 48, 18

[56] References Cited

U.S. PATENT DOCUMENTS

| 1,673,429 | 6/1928 | Vinson | 126/271 |
| 3,243,117 | 3/1966 | Morgan | 126/270 |
| 3,832,992 | 9/1974 | Trombe et al. | 126/270 |
| 4,037,583 | 7/1977 | Bakun et al. | 126/271 |
| 4,049,046 | 9/1977 | Worthington | 126/271 |
| 4,122,828 | 10/1978 | DiPeri | 126/400 |

FOREIGN PATENT DOCUMENTS

| 2767880 | 11/1955 | Australia | 126/270 |
| 994150 | 11/1951 | France | 126/271 |
| 2274879 | 1/1976 | France | 126/270 |
| 321665 | 2/1972 | U.S.S.R. | 126/271 |

Primary Examiner—James C. Yeung
Attorney, Agent, or Firm—Watson, Leavenworth, Kelton & Taggart

[57] ABSTRACT

A solar heat collector consisting essentially of metal sections. The collector may be integrated with a heat storage medium, for example a concrete slab. Furthermore the collector may be provided with separate channel systems for passing heat from the collector to the various rooms of a house.

4 Claims, 6 Drawing Figures

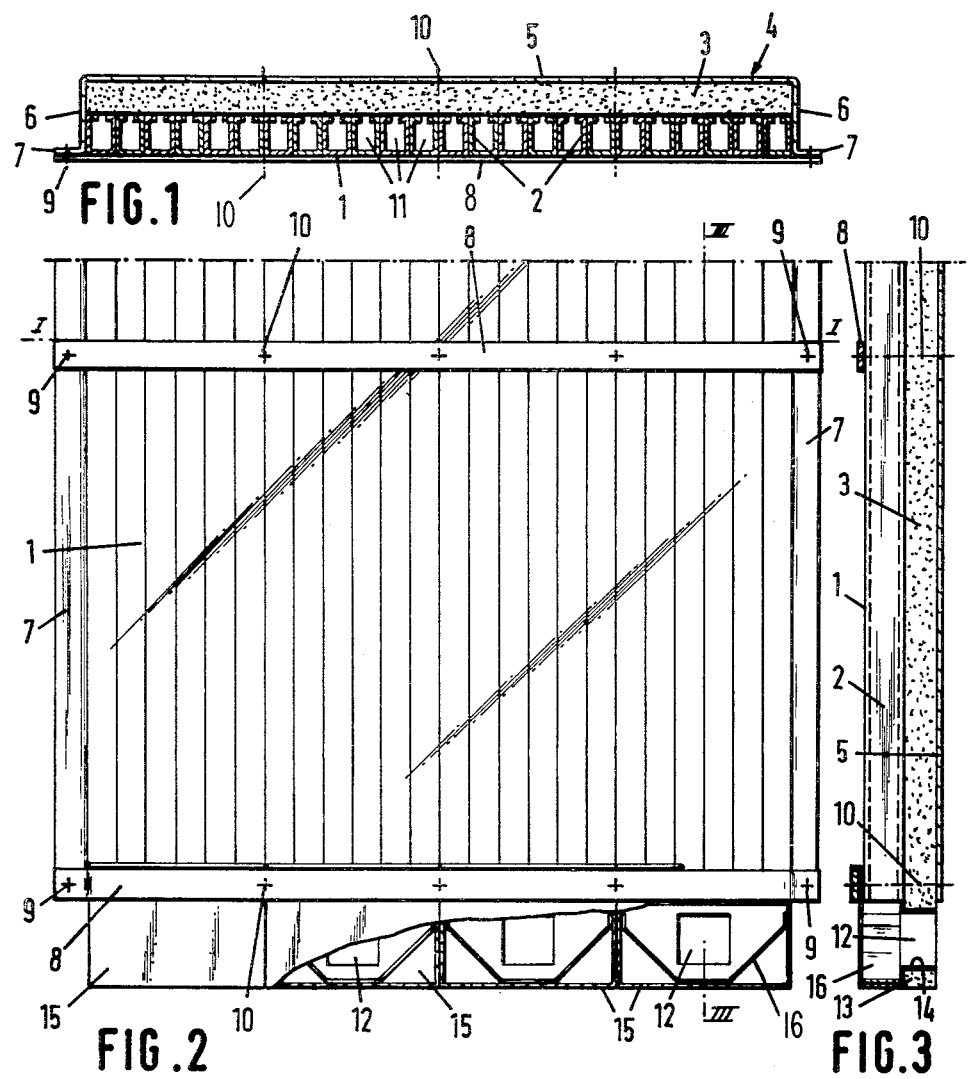

FIG. 5
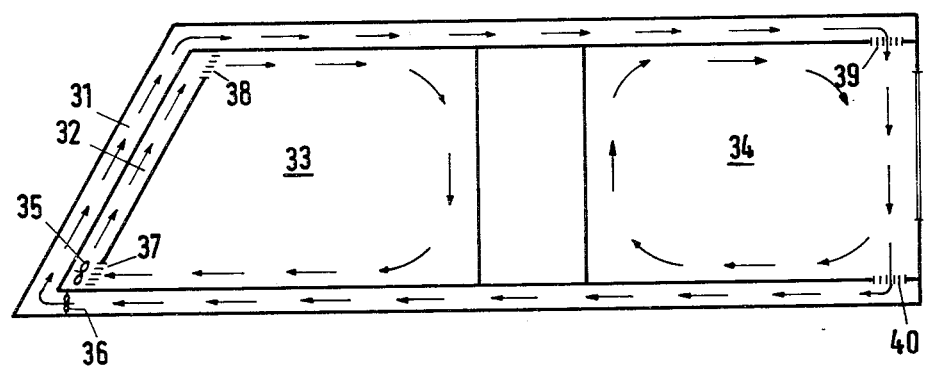
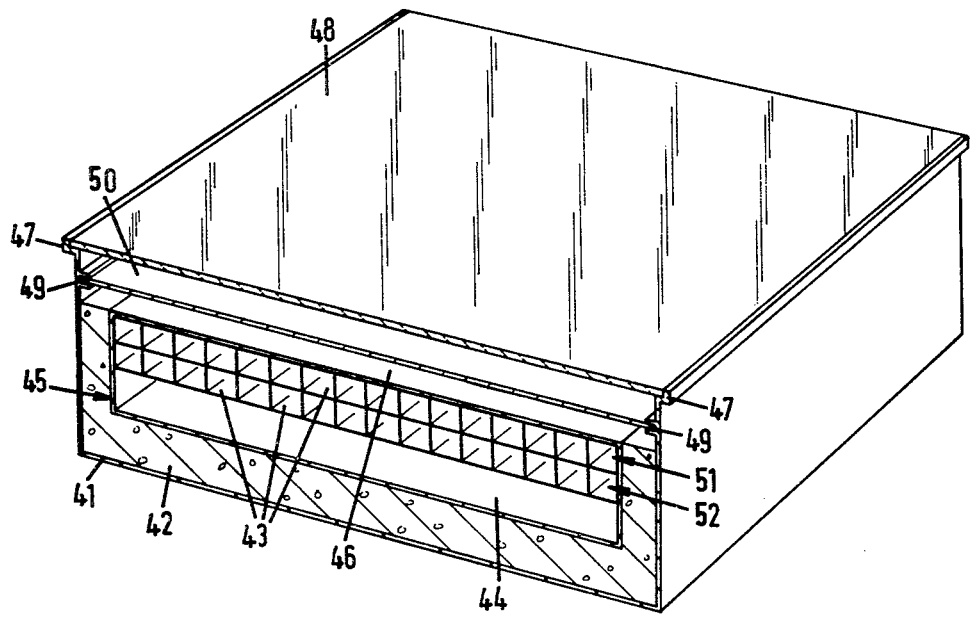
FIG. 6

METHOD AND APPARATUS FOR UTILIZING SOLAR HEAT

This invention relates to a method and apparatus for utilizing solar energy.

The invention relates in particular to a solar heat collector, a combined collector and heat storage unit, and to a method and apparatus for collecting and storing solar heat and distributing it through a building for heating purposes.

An important part of solar heating installations is the collector, which can be installed, for example, in or on the roof of a building where it is subjected to solar radiation. As a result the collector will be heated, and the heat collected is transferred by the collector to a flowing medium, such as air, whereby the heat is transported either to a storage unit or to the various rooms in the building.

One important requirement which such a collector should satisfy is that the material to be heated by solar radiation should be of low heat capacity, in order that it is rapidly heated up when irradiated, which is especially of importance during periods of intermittent sunshine. Another important requirement is that the material heated by the sun rays must be in contact with the flowing medium over as large an area as possible.

It is one object of the present invention to provide a collector for collecting solar heat and transferring heat to a gaseous flowing medium, such as air, which is of simple and relatively inexpensive construction, and in which the material to be heated by the sun rays is of low heat capacity and has a large area for contact with the meduim.

According to one aspect of the present invention, therefore, there is provided a collector for collecting solar heat and transferring heat to a flowing gaseous medium, such as air, comprising a surface for collecting solar heat and a space through which said medium can flow, characterized in that the surface for collecting solar heat is formed by wall portions of a plurality of metal sections.

The sections, for example, channel sections, may be disposed in contact with each other so as to form a panel having a substantially flat surface on one side and, depending on the shape of the sections, a plurality of parallel open channels on the other.

According to a preferred feature of the invention, insulation material is provided on the side of the panels away from the surface to be subjected to the sun rays. There are thus formed a plurality of closed channels in the collector, surrounded by the metal to be heated by the sun, on the one hand, and insulating material, such as glass wool or foamed plastics, on the other.

The metal sections may also be closed on all sides, for example, they may be of rectangular cross-section.

In order that the sections may be easily fixed together and to the insulation material, and in order that air supply and discharge lines may be installed in a simple manner, a further preferred feature of the invention is that the insulating material and the contacting sections are housed in a holder in the shape of an open channel and are fixed therein by strapping passed over the surface to be irradiated and secured to the holder, means being provided at opposite ends of the holder for connecting conduits thereto for the supply and discharge of a gaseous medium.

The collector according to the invention may be installed on the roof of a house to be heated by solar heat, whence the heat collected is transported by means of a gaseous heat transporting fluid, such as air, to a heat storage unit, where the heat is transferred in a heat exchanger to a heat storage medium, for example, water, gravel or concrete. It is also possible for the heat collected to be transported direct to the rooms to be heated, for example, in the form of heated air. Generally speaking, however, a heat storage system is desirable even in those cases, in order that a surplus of heat collected may be used for heating during periods when the sun does not shine, for example, at night.

It is a further object of this invention to provide a combined solar heat collector and storage unit which makes it possible, on the one hand, to transfer collected heat rapidly to a heat transporting medium, such as air, and on the other hand, to store a possible surplus of energy in an inexpensive and simple manner.

According to a further aspect of the present invention, therefore, there is provided a combined solar heat collector and storage unit, comprising a heat collecting surface formed at least in part of wall portions of metal tubes through which a gaseous heat transporting medium can be passed, said tubes having other wall portions in direct contact with a heat storage medium.

The surface of the metal tubes forming the collector surface may be provided with a spectral-selective coating to reduce emission of heat through radiation. The wall portions of the tubes constituting the surface to be subjected to the sun rays are preferably flat, for which purpose, for example, tubes of rectangular cross-section may be used.

the heat storage medium may consist, for example, of a thermal oil, water, an eutectic salt mixture, or a like liquid stored in a reservoir of which a wall portion forms part of the collector. In a preferred embodiment the storage medium is a concrete slab.

Owing to the relatively high heat-conductivity coefficient of the metal, the sun rays will rapidly heat up the entire metal tubes, so that the heat transporting medium within the tubes can be rapidly heated up. Accordingly, the collector reacts fast, i.e. shortly after the sun has begun to shine a maximum of heat can be carried off if such heat is needed for direct heating. The quantity of heat to be carried off can be regulated, for example, by controlling the rate of flow of the heat transporting medium. The heat not carried away can simultaneously be conducted through the metal of the tubes to the heat storage medium.

The collector-storage unit according to the invention accordingly makes possible optimum discharge and storage of collected heat, while yet a simple and relatively inexpensive construction is used.

The metal tubes may be arranged in the concrete in side-by-side contact with each other, so that they form the entire collector surface. In a preferred embodiment of the invention, however, the metal tubes are embedded in the concrete so as to be flush therewith and in spaced interrelationship, i.e. the interspaces between the tubes are filled with concrete. This ensures that the tubes are properly ecured in the concrete and that there is a large area of contact between the concrete and the metal of the tubes.

The collector-storage unit according to the invention can of course be provided with additional piping or conduits within the heat storage medium, for example, for hot-water facilities, additional means for reducing the emission of heat to the exterior, an insulating backing on the concrete slab, etc. Also, the unit may be provided with means at one or both edges for coupling similar units to it.

A further object of the present invention is to provide a method of distributing solar heat collected by a collector, so that rooms of different heat requirements can be provided with heat in a controlled manner.

According to still another aspect of the invention, therefore, there is provided a method of distributing solar heat collected by a collector to various rooms in a building, which comprises collecting the solar heat with a collector comprising separate channel systems for the passage of a heat transporting medium, and conducting the heat collected by means of said heat transporting medium through separate piping systems to said various rooms.

Preferably, a separate means for propelling the heat transporting medium is provided for each channel system for controlling the rate of flow of the medium in each individual channel system.

The advantage is that rooms which require more heat, such as those facing north of a storey to be heated, can be provided direct, and in a simple manner with air of a higher temperature as compared to those facing south.

According to a still further aspect of the present invention there is provided a solar heat collecting, storing and distributing apparatus comprising a solar heat collecting surface formed, at least in part, of metal wall portions of tubular passages for a heat transporting medium, said passages having other wall portions in heat-conductive contact with a heat storage medium, and at least some of said passages being of mulitple construction to form subpassages which are located one behind the other in the direction of incidence of solar radiation, and are interconnected in heat conductive interrelationship, and, together with other passages, which may or may not be of multiple construction, form separate channel systems for said heat transporting medium.

According to an advantageous embodiment of the subject apparatus, said heat collecting surface consists of wall portions of a layer of side-by-side metal tubes together forming a first channel system for a heat transporting medium, said layer of tubes being connected in heat-conductive relationship with a second layer of metal tubes located behind said first layer of tubes in the direction of incidence of solar radiation, the tubes of said second layer forming a second channel system for a heat transporting medium.

The heat storage medium preferably consists of a reservoir filled with water, oil, or an eutectic salt mixture, but may also be a concrete slab embedding the tubes in heat conducting relationship.

The surface of the metal tubes to be subjected to the sun's rays may be provided with a spectral-selective coating, or be painted black to optimize the collecting of heat and minimize emission of heat through radiation, Preferably the wall portions of the tubes forming the surface to be subjected to solar radiation are flat surfaces, for which purposes, for example, tubes of rectangular section may be used.

Owing to the solar irradiation, the wall portions of the tubular passages and subpassages are rapidly heated up, as a result of the relatively high co-efficient of heat conductivity, so that the heat transporting medium within the tube systems, too, can be heated up rapidly and effectively. As a consequence, shortly after the sun has begun to shine a maximum of heat can be discharged, while as a result of the separate collection and distribution of the heat, rooms demanding more heat can be provided with more heat. Heat not carried off can be simultaneously passed through the metal of the tubes to the heat storage medium.

In another embodiment of the present invention, the metal tubes in each layer are arranged in spaced side-by-side interrelationship in the concrete, the interspaces being filled with concrete.

The subject collector-distributing apparatus can be provided with additional conduits within the storage medium, for example, for hot-water facilities. Furthermore, in order to prevent loss of heat through radiation, it is preferable to apply an insulating backing at the rear of the heat storage medium, which makes possible a better control of the heat distribution. Means may be provided for connecting a plurality of collectors together in order to provide a collector of a given heat collecting area.

Some embodiments of the invention will now be described, by way of example, with reference to the accompanying drawings. In said drawings, FIG. 1 is a cross-sectional view of one embodiment of a collector according to the present invention, taken on the line I—I of FIG. 2;

FIG. 2 is a partial plan view of the collector shown in FIG. 1;

FIG. 3 is a partial longitudinal sectional view of the collector on the line III—III of FIG. 2;

FIG. 5 is a diagrammatic cross-sectional view of a storey of a house provided on the side facing south with a collector-distribution system with two separate channel systems for a heat transporting medium; and FIG. 6 is a perspective cross-sectional view of an embodiment of a collector with separate channel systems.

Figure 4:
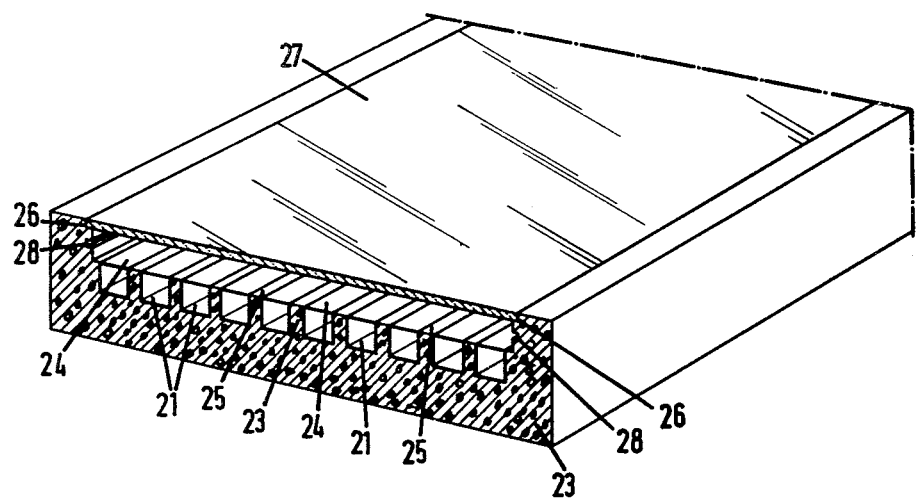
FIG. 4 is a cross-sectional perspective view of a combined collector-storage unit according to the present invention.

Referring now to the drawings, FIG. 1 is a cross-sectional view and shows a collector front surface 1 to be subjected to the sun rays, and assembled from a plurality of channel sections 2 disposed in contact with one another in side-by-side relationship. The webs of sections 2 together form the front face 1. The open ends of the channel sections rest against a sheet 3 of insulating material, for example, foamed plastics. Sheet 3 and sections 2 are housed in a channel-shaped holder 4, essentially consisting of a rear wall 5, sidewalls 6, and rims 7. Holder 4 may consist, for example, of metal or plastics.

The dimensions of sheet 3, sections 2 and holder 4 are such that sheet 3 and sections 2 just fit holder 4, so that front face 1 formed by sections 2 is virtually co-planar with rim members 7 of the holder.

Sections 2 are fixed in the holder and held in contact with sheet 3 by straps 8, which may be bolted to rim members 7 of holder 4 with bolts 9. Additional bolts 10, passing through a strap 8, the layer consisting of sections 2, sheets 3 and rear wall 5 of the holder, are used for additional rigidity. Bolts 9 and 10 are indicated in FIGS. 1 and 3 with dash-dot lines and in FIG. 2 with a cross.

FIGS. 2 and 3 show means for connecting conduits for supplying and discharging air as a heat transporting medium, which is circulated through spaces 11 of sections 2 to be heated therein during its passage through them. These connecting means are provided at both ends of the collector, and are each constituted by four square holes 12 terminating at the back of the collector, for example, into a supply or discharge channel for the medium, located behind the collector.

Holes 12 are formed in a member 13 of foamed plastics projecting from holder 4, through which extends a tubular member 14 of a stub 15. Stubs 15 are fixed by straps 8 provided at the end of holder 4. Stubs 15 are best shown in FIG. 2, in which some parts have been broken away and consist of a box-shaped portion to which a tubular member 14 is secured, and in which guide walls 16 for the flowing air are provided.

In the embodiments shown, channel sections are used. However, other sections may be used, such a L-sections, disposed so that one leg of the L forms part of the front face of the collector, and the other leg partitions off the space through which the air flows, to form separate channels therein.

The advantage of using sections is their low cost price, and the possibility of choosing the wall thickness of the front face of the collector and of the partitions between the channels virtually at will. Also, the surface area of the inner walls of the channels, i.e. the area of the metal which gives off heat to the heat transporting medium, can be selected at will owing to the form of the sections.

Generally speaking, the collector will be mounted behind a single or double glass pane. In particular when a single glass pane is used in front of the collector front face, said front face may be provided with a spectral-selective coating to achieve a relatively low co-efficient of emission of the collector.

FIG. 4 shows a cross-sectional perspective view of an embodiment of a collector-storage unit according to the invention. The collector-storage unit may, for example, be 5 meters long, 1 meter wide, and have a total thickness of 0.25 meter, and will be disposed at an angle of about 60°. Thus a plurality of units may form at least part of the roof of a house.

As shown, the collector-storage unit comprises a plurality of parallel metal tubes 21 of square cross-sectional configuration, disposed in spaced relationship to each other. Tubes 21 are embedded in concrete 23 so that wall portions 24 of the tubes are flush with the concrete. These wall portions 24, together with the surface 25 of the concrete between them form the collector surface to be subjected to solar radiation. This surface may be provided with a black coating or with a spectral-selective coating to increase the heat absorbing capacity and reduce emission through radiation, respectively. Present day techniques only allow a spectral-selective coating to be applied to metal, i.e. to wall portions 24 of tubes 21.

Concrete 23 is provided with a rebate 26 for receiving a glass pane 27, which may be a double glass pane, and with a recess 28 for guiding a screen, not shown, which can be drawn between glass pane 27 and collector surface 24, 25.

At both ends of the collector-storage unit the tubes 21 can be connected, in a conventional manner, to supply and discharge conduits for air as the heat transporting medium to be passed through tubes 21. Air can be blown through the tubes my means of a blower, and then be passed to the rooms of the house to be heated.

The collector-storage unit shown in FIG. 4 is in particular of advantage when used in regions where the weather is often clouded with sunny intervals. In those conditions it is of great importance that the heat collected should be effectively utilized as soon as the sun shines.

In the collector-storage unit as shown, as soon as the sun shines wall portions 24 of tubes 21 will be heated, and owing to the high heat conductivity of the metal, the heat will spread throughout the tube walls. This makes it possible to discharge the required amount of heat through the air flowing through the tubes, relatively soon after the sun begins to shine. The amount of heat discharged can be controlled by controlling the rate of flow of the air through tubes 21.

Heat not discharged will be passed through the metal of tubes 21 direct to the storage medium, in the present case concrete. In the periods when the sun does not shine, for example, at night, the storage medium, i.e. the concrete, will give off heat through tubes 21 to the air flowing therein, to an extent depending on the velocity of the air through the tubes.

Generally speaking, of course, conventional heating means will be provided to supplement the heat produced by the solar unit whenever necessary.

For the provision of hot water, additional lines, not shown in Fig. 4, may be provided in the concrete.

FIG. 5 shows a diagrammatic cross-section through a storey of a house provided on the side facing south with a collector disposed at an angle of aproximately 60°, and shown in the figure only with its separated channel systems 31 and 32 through which air can be passed as a heat transporting medium. The heat collected in the walls of channel systems 31 and 32 is passed by means of the heat transporting medium, in the present case air, by separate routes to different rooms 33 and 34.

The air which via the ceiling of the storey is conducted to room 34 facing north (on the righ-hand side in FIG. 4) is rapidly heated as a result of the direct irradiation of channel system 31, and has a higher temperature than the air which is passed to room 33, facing south, via channel system 32. The rate of throughflow of the air, can be controlled by a separate blower for each of the two channel systems. The blowers are designated by reference numerals 35 and 36. Naturally, grids 37, 38, 39 and 40, provided for the separate circulation systems. may be arranged in various manners and places in the rooms. The air circulation pattern may also be reversed.

FIG. 6 is a perspective cross-sectional view, showing an example of a collector with separate channel systems. The unit will be, for example, 5 meters long, 1 meter wide, and have a total thickness of 20 centimeters, and will be disposed at an angle of 60°. A plurality of such units may thus form at least part of the facade on the side of the storey facing south.

As shown, the unit comprises a box 41, an insulating layer 42, a plurality of parallel tubes 43, and a reservoir 44 for a heat storage medium, the tubes and the reservoir being formed of aluminum to form a subassembly 45. Wall portions of the tubes together form a surface 46 to be irradiated by the sun. This surface may be provided with a coat of black paint or with a spectral-selective coating.

Box 41 is further provided with means 47 for receiving single or double glass pane 48, and with means 49 for guiding a screen 50. This screen 50 can be drawn between glass pane 48 and collector surface 46, serving to reduce external radiation during prolonged periods when the sun does not shine, for example, at night.

At both ends of the unit the laminate channel systems 51 and 52 can be connected to supply and discharge ducts for the heat transporting medium to be passed through the separate channel systems, in the present case air.

The air can be passed through the channel systems by means of separate blowers 35 and 36, and thence to rooms to be heated, located on the sides of the storey facing north and south.

When the sun is going to shine the wall portions of the tubes 43 which form the collector surface 46 will be heated up first, so that the rooms facing north, i.e. those having the greatest need of heat, may be rapidly provided with heat. Owning to the conductive properties of the metal, the tubes of the subjacent channel system 52 are also heated up relatively rapidly, so that subsequently the rooms of the storey facing south may likewise be provided with heat. The blowers are controlled by suitable temperature responsive means.

The subject solar heat installation accordingly permits optimum heating, storey by storey, of rooms having different heat requirements, in particular those facing north and those facing south, while yet a simple and relatively inexpensive construction is used.

Generally speaking, of course, conventional heating means will be provided, for instance, radiators, for supplementing heat whenever the unit should fail to produce sufficient heat to meet requirements.

I claim:

1. A combined solar heat collector and storage unit comprising:

a heat storage concrete slab medium having an outer surface portion;

a number of metal tubes embedded in spaced relationship in said medium, each of said metal tubes being adpated to pass therethrough a heat transporting medium and including a wall portion disposed exteriorly of a corresponding section of said outer surface; and a heat collecting surface comprising said wall portions of said number of metal tubes and the sections of said outer surface situated therebetween.

2. A unit in accordance with claim 1 wherein:

said wall portions are flush with the sections of said outer surface portion situated therebetween 3. A unit in accordance with claim 2 wherein:

said tubes are of rectangular cross-sectional configuration.

4. A unit in accordance with claim 1 wherein:

said outer surface portion has a number of spaced grooves therein;

and each of said tubes is disposed in a different one of said grooves.

* * * * *